United States Patent
Kakadia (10) Patent No.: US 7,382,725 B1
(45) Date of Patent: Jun. 3, 2008

(54) METHOD AND APPARATUS FOR SCHEDULING PACKETS IN A MULTI-SERVICE INTEGRATED SWITCH FABRIC

(75) Inventor: Deepak K. Kakadia, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 798 days.

(21) Appl. No.: 10/846,291

(22) Filed: May 13, 2004

Related U.S. Application Data (60) Provisional application No. 60/551,987, filed on Mar. 9, 2004.

(51) Int. Cl.
*H04J 3/16* (2006.01)
*H04L 12/56* (2006.01)
(52) U.S. Cl. .............. 370/230; 370/392; 370/395.43; 370/412
(58) Field of Classification Search ............ None
See application file for complete search history.

(56) References Cited

U.S. PATENT DOCUMENTS

| | | | |
|---|---|---|---|
| 6,201,793 B1* | 3/2001 | Chen et al. ............... 370/238 |
| 6,262,986 B1* | 7/2001 | Oba et al. ................. 370/399 |
| 7,154,885 B2* | 12/2006 | Nong ........................ 370/380 |
| 2001/0007562 A1* | 7/2001 | Matsuoka et al. ......... 370/415 |
| 2002/0024970 A1* | 2/2002 | Amaral et al. ............. 370/468 |
| 2003/0048793 A1* | 3/2003 | Pochon et al. ............ 370/401 |
| 2004/0085897 A1* | 5/2004 | Jacobi et al. ............. 370/229 |

\* cited by examiner

*Primary Examiner*—Chi Pham
*Assistant Examiner*—Soon D. Hyun
(74) *Attorney, Agent, or Firm*—Park, Vaughan & Fleming LLP (57) ABSTRACT

One embodiment of the present invention provides a system that facilitates scheduling packets in a multi-service integrated switch fabric wherein packet services are attached directly to the switch fabric. During operation, the system receives a packet at the switch fabric. Upon receiving the packet, the system uses pre-defined rules to identify packet services to perform operations on the packet. The system then attaches a tag to the packet, which identifies the packet services to be performed on the packet. The system then schedules the packet on the switch fabric. During the scheduling process, the system considers the packet services identified by the tag and the occupancies of queues associated with the identified packet services when scheduling the packet in an attempt to optimize network throughput.

20 Claims, 5 Drawing Sheets

METHOD AND APPARATUS FOR SCHEDULING PACKETS IN A MULTI-SERVICE INTEGRATED SWITCH FABRIC

RELATED APPLICATION

This application hereby claims priority under 35 U.S.C. § 119 to U.S. Provisional Patent Application No. 60/551,987, filed on 9 Mar. 2004, entitled, "Flexible Multiservice Integrated Switch Fabric Scheduling Algorithm with Minimal Packet Delay," by inventor Deepak Kakadia.

BACKGROUND

1. Field of the Invention

The present invention relates to computer networks. More specifically, the present invention relates to a method and an apparatus for scheduling packets in a multi-service integrated switch fabric.

2. Related Art

Because of the increasing volume and complexity of data center applications, it has become increasingly common for businesses and data centers to separate enterprise applications into three or more tiers. This n-tier architecture provides the benefits of improved scalability and performance, as well as increased security.

In addition to the n-tier model, more complex IP services, such as SSL, XML, URL switching and NAT, are being relocated from general purpose servers to specialized hardware appliances. These "packet services" are performed on each packet regardless of the data payload of the packet.

While IP service specialization has many potential benefits, including faster processing and better security, this specialization increases network traffic and places an added burden on the network switch fabric. In a traditional client-server environment, the network switch fabric sees a stream of packets coming into the server and another stream of packets returning to the client. However, in current n-tier models, as clients interact with enterprise applications, as well as with specialized appliances and servers, the same packets traveling between the client and the enterprise application can potentially get routed to many specialized appliances and servers, and can consequently generate much more traffic in the local switch fabric than the simple two-way traffic in traditional systems.

In order to handle increased traffic on the local network, organizations have typically increased their bandwidth with faster switches, as well as with more intelligent packet-scheduling switches. These packet-scheduling switches prioritize traffic according to various criteria including, the type of packet and the destination of the packet. However, these packet-scheduling switches typically only consider the next destination for a packet. For example, if a packet is encrypted via Secure Socket Layers (SSL), and is consequently being routed to an SSL appliance, the packet is scheduled on the switch fabric using only knowledge of the required SSL services. If the packet will subsequently require another service, such as Network Address Translation (NAT), after SSL, the need for NAT is not considered when scheduling the packet for the SSL service. This can lead to sub-optimal scheduling decisions. For example, if the SSL service queue is currently occupied, and the NAT service queue is empty, it is preferable for the packet-scheduling switch to route the packet to the empty NAT service queue prior to routing the packet to the occupied SSL service queue, instead of routing the packet to the busy SSL service queue first.

Hence, what is needed is a method for scheduling traffic on a switch fabric in a manner that considers all of the services needed by each packet.

SUMMARY

One embodiment of the present invention provides a system that facilitates scheduling packets in a multi-service integrated switch fabric wherein packet services are attached directly to the switch fabric. During operation, the system receives a packet at the switch fabric. Upon receiving the packet, the system uses pre-defined rules to identify packet services to perform operations on the packet. The system then attaches a tag to the packet, which identifies the packet services to be performed on the packet. The system then schedules the packet on the switch fabric. During the scheduling process, the system considers the packet services identified by the tag and the occupancies of queues associated with the identified packet services when scheduling the packet in an attempt to optimize network throughput.

In a variation on this embodiment, the packet services perform operations related to: server load balancing, firewall, half Network Address Translation (NAT), full NAT, Level 7 processing, Level 4 forwarding, Secure Socket Layers (SSL), Internet Protocol Security (IPSec), Layer 2 Tunneling Protocol (L2TP), layer 2 routing, and layer 3 routing.

In a variation on this embodiment, the packet services perform operations on the packet that do not depend on the packet payload.

In a variation on this embodiment, the system receives a second packet at the switch fabric and uses pre-defined rules to identify packet services to perform operations on the second packet. The system then attaches a tag to the second packet, which identifies the packet services to be performed on the second packet. The system then schedules the second packet on the switch fabric. While scheduling the second packet, the system considers the packet services identified by the tags of the preceding packet and of the second packet and the occupancies of queues associated with the identified packet services.

In a variation on this embodiment, the switch fabric is a data center switch fabric, which is arranged according to an n-tier application model and includes specialized servers and/or appliances for performing various packet services.

In a variation on this embodiment, the packet is scheduled on a Combined Input/Output Queued (CIOQ) switch.

In a variation on this embodiment, the packet services are performed by a special purpose processor.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Data Center Architecture

Current technology datacenter networking equipment building blocks are typically composed of established high-volume, optimized layer 2 and layer 3 packet switches, as well as relatively new appliances for more complex IP services, such as Secure Socket Layers (SSL), Extensible Markup Language (XML), Universal (or Uniform) Resource Locator (URL) switching, and Network Address Translation (NAT). These appliances have evolved from functions that were previously performed on general purpose servers. Many of the functions that are performed by these appliances and servers are available in general purpose CPUs and Application-Specific Integrated Circuits (ASICs.) The present invention provides a method to combine and integrate these switches, servers, and appliances to produce a switch fabric that is cost-effective and optimized for the data center traffic patterns.

In some embodiments of the present invention, the packet services perform operations related to: Level 7 processing, Level 4 forwarding, layer 2 routing, and layer 3 routing, as defined by the Open Systems Interconnection Basic Reference Model (OSI Model), wherein layer/level 2 is the Data Link layer, layer/level 3 is the Network layer, layer/level 4 is the Transport layer, and layer/level 7 is the Application layer.

Figure 1A:
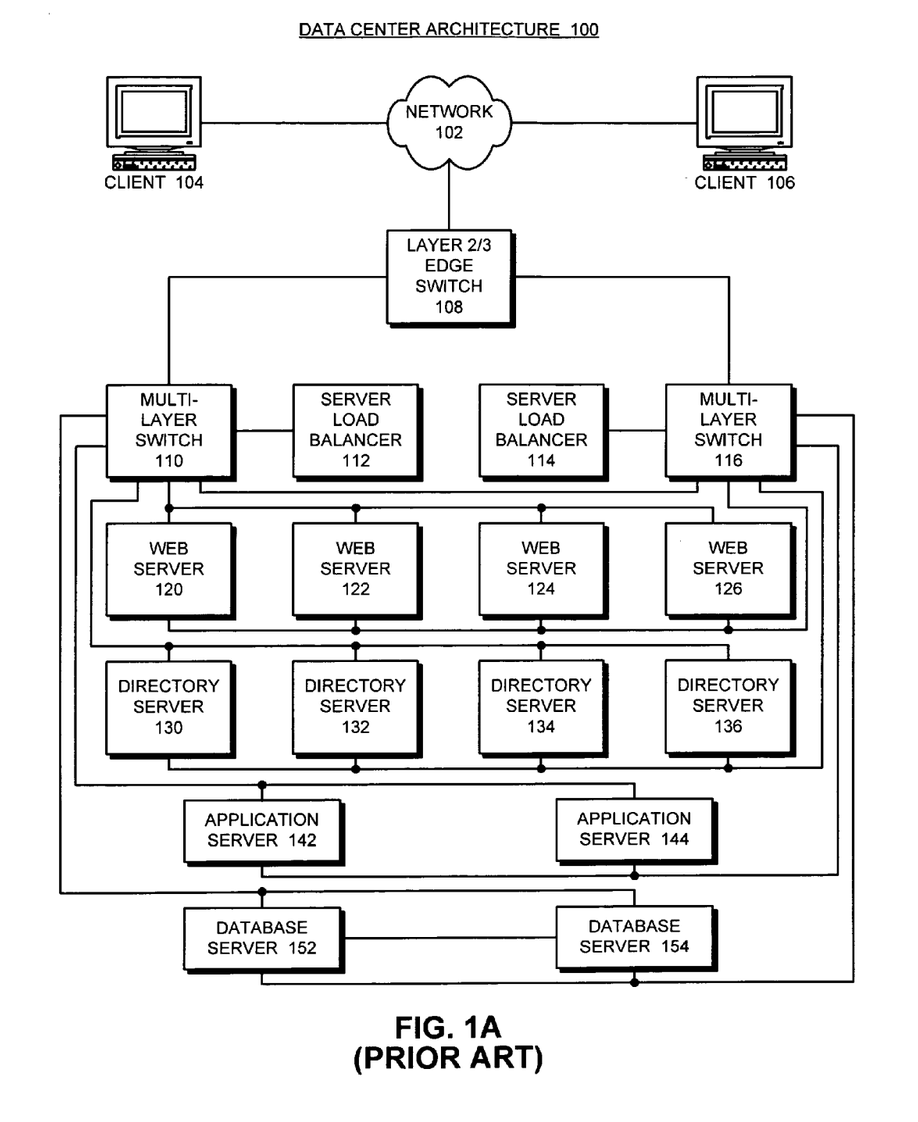
FIG. 1A illustrates a datacenter n-tier architecture.

FIG. 1A illustrates a typical datacenter n-tier architecture 100. Datacenters have evolved to host enterprise applications that can be shared over networks with large numbers of clients. In the example shown in FIG. 1A, clients 104 and 106 are coupled to network 102. Note that clients 104 and 106 can generally include any node on a network including computational capability and including a mechanism for communicating across the network. Network 102 can generally include any type of wire or wireless communication channel capable of coupling together computing nodes. This includes, but is not limited to, a local area network, a wide area network, or a combination of networks. In one embodiment of the present invention, network 102 includes the Internet.

Datacenter n-tier architecture 100 includes various tiers of switches, servers, and appliances that provide specific functions. In the embodiment illustrated in FIG. 1A, datacenter architecture 100 includes six tiers. The first tier, or "edge-switch tier," is comprised of layer 2/3 edge switch 108, which couples the "multi-layer-switch tier" to network 102. The multi-layer-switch tier is comprised of server load balancers 112 and 114 and multi-layer switches 110 and 116, which switch and control the flow of traffic between all of the tiers in datacenter architecture 100.

The multi-layer-switch tier is coupled to the web-services tier, the directory-services tier, the application-services tier, and the database-services tier. The web-services tier is comprised of web servers 120-126, the directory-services tier is comprised of directory servers 130-136, the application-services tier is comprised of application servers 142 and 144, and the database-services tier is comprised of database servers 152 and 154.

Web servers 120-126, directory servers 130-136, application servers 142 and 144, and database servers 152 and 154 can generally include any nodes on a computer network including a mechanism for servicing requests from a client for computational and/or data storage resources. In many cases, these servers are specially-tuned server appliances that are dedicated to one or a few limited tasks. Also note that each tier can contain various intermediate switches to balance traffic within the tier. For example, the database-services tier typically has switches that allow the database servers to be coupled together for the purposes of fault-tolerance and replication.

In one embodiment of the present invention, datacenter architecture 100 performs a series of independent serial processing operations on a packet. For example, traffic from client 104 is first routed to a firewall function, which performs firewall operations and then rewrites the packet so that the packet is routed to another IP device, such as a NAT function. The NAT function performs NAT-related operations and then rewrites the packet again so that the packet is routed to a new destination.

In contrast, the present invention exploits the knowledge of the entire set of services that are to be performed on the packet to create one integrated device that performs one packet classification lookup and identifies all of the services to be performed on the packet. The system also determines in what sequence the services need to be performed, and then makes intelligent packet-scheduling decisions which proactively schedule the packet throughout the switch fabric to prevent future congestion.

Layer 2-3 Edge Switch

Figure 1B:
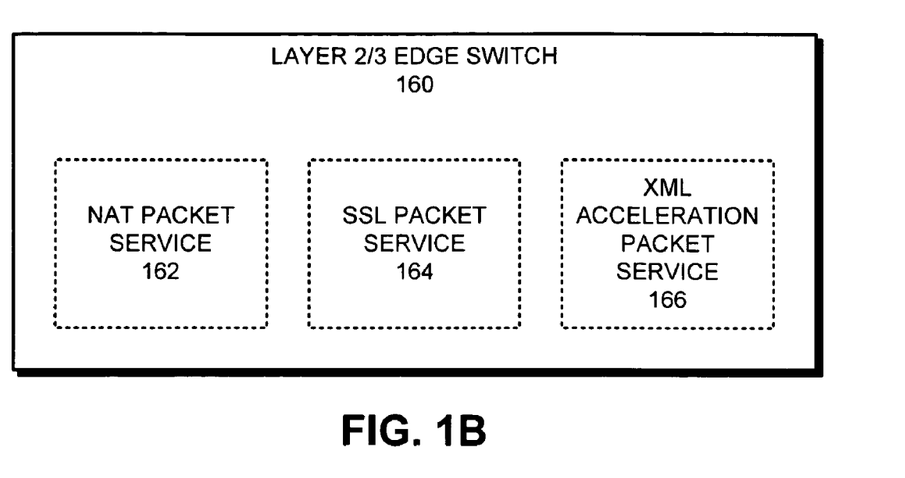
FIG. 1B illustrates a layer 2/3 edge switch in accordance with an embodiment of the present invention.

FIG. 1B illustrates layer 2/3 edge switch 160 in accordance with an embodiment of the present invention. Layer 2/3 edge switch 160 includes NAT packet service module 162, SSL packet service module 164, and XML acceleration packet service module 166. Note that layer 2/3 edge switch 160 may contain any number of specialized packet services not limited to those illustrated in FIG. 1B.

NAT packet service module 162, SSL packet service module 164, and XML acceleration packet service module 166 can include general purpose CPUs or Application-Specific Integrated Circuits (ASICs) that are integrated into layer 2/3 edge switch 160 and duplicate the functionality that once required specialized servers or appliances. By integrating these services directly into the switch fabric contained in layer 2/3 edge switch 160, data-center architecture 100 can realize increased speed and throughput while realizing reduced cost. Not only does the elimination of extraneous devices result in greater cost-efficient switches, but it also results in reduced space and power requirements within the data center.

Traffic Flow

Figure 2:
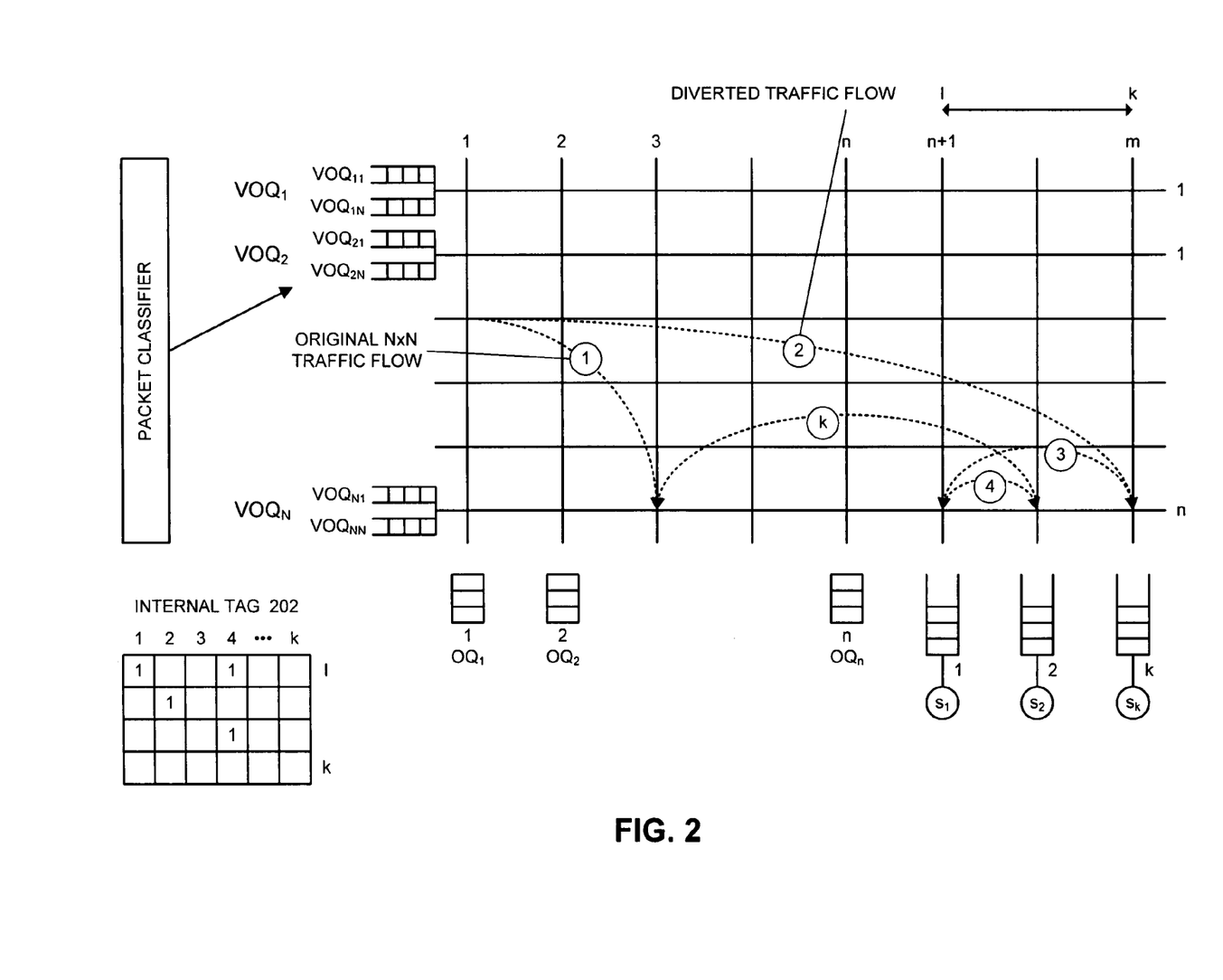
FIG. 2 illustrates traffic flow in accordance with an embodiment of the present invention.

FIG. 2 illustrates traffic flow in accordance with an embodiment of the present invention. As illustrated in FIG. 2, on path 1, if services were performed on packets prior to entering the switch traffic, the traffic would simply flow from inputs to outputs. In doing so, the packets would experience normal input port resource contention and output port contention where a packet scheduler would typically resolve such conflicts. The services would normally be performed on packets or flows prior to reaching the input side.

However, in one embodiment of the present invention k more ports are allocated for services to be performed on packets. For example, a packet on path 1 can be diverted to path 2, 3, . . . , or k, depending on the number and sequence of services to be performed on this packet. Note that packets that cause contention for packet services are logically segregated from packets that do not require any service processing. Hence, the present invention does not do any worse by adding the packet services. Input port contention and output port contention still exist, but these are now wider apart in a packet's lifecycle in the fabric.

When the packet is classified, it is known exactly what services are to be performed on the packet, and what sequences of these services are allowed. The packet scheduler makes decisions that minimize overall session delay by considering for each time slot where a particular packet can be forwarded for service, taking into account the queue size and processing service time from the set of required services for this packet.

Suppose there are two packets, packet a and packet b. Packet a is destined for output port 1, and requires ordered services $s_1$ and $s_3$. Packet b is also destined for output port 1, and requires ordered services $s_i$ and $s_2$ Suppose packet a will require longer service time at $s_1$ than packet b. The packet classifier can know this a priori, and can place state information in internal tag 202, pre-pended to the packet header. This state information allows the scheduler to make informed scheduling decisions, and in this case, will schedule packet b at $s_1$ prior to packet al. The end result is that packet a is initially scheduled for $s_3$ and packet b is scheduled for $s_1$. Upon completion of their respective services, packet a is then scheduled for $s_1$ and packet b is scheduled for $S_2$. In contrast, in a traditional system, packet a would be scheduled for $s_1$ and packet b would also be scheduled for $s_1$. Packet b would then sit idle waiting for $s_1$ and would not be scheduled for $S_2$ until after it completes at $s_1$.

Other factors that the system considers in making scheduling decisions may include the packet length and the state of the SSL session, where different phases require different service times, etc. In traditional systems, the unmodified Maximum Weight Matching (MWM) packet scheduling technique schedules packet a first, due to the longer processing time required at $s_1$. Packet b is then queued up at $s_1$, blocked by the longer processing time of packet al. The average delay experienced by both packets is larger than that of the average delay if packet b was scheduled ahead of packet a.

Internal tag 202 represents all of the services to be performed on the packet for which internal tag 202 is attached. In addition, to the required services, internal tag 202 also represents any required ordering of the services. In the example illustrated in FIG. 2, internal tag 202 represents a packet that requires services 1 and 4 in either order. Upon completion of these services, the packet represented by internal tag 202 then requires service 2, followed by service 4 a second time.

Another scenario showing improvement opportunity over the Oldest Cell First (OCF) technique is as follows. Suppose packet b has been waiting a long time, and that $VOQ_{IN}$ has just drained after t+y time slots, while packet a just arrived at time t. Clearly, packet b would be scheduled first according to the OCF technique. However, suppose that the timing budget of packet b has sufficient headroom that $s_1$ and $S_2$ can be quickly processed with one time slot each and that t+y+2 is z time slots under budget. Packet a will be bogged down at $s_3$, and the queue would continue to build. Packet a needs to be immediately placed on the $s_3$ queue before any other packet is placed on that queue. In this case, a modification to the OCF technique involves computing the overall finish time based on the services required, service times, and queue delays based on current queue size, which can be computed at each time slot.

One of the current issues involved in bolting on service processing with layer2/3 switches is that the interfaces permit only flow-thru or look-aside services. For example, to perform SSL acceleration, hardware ASIC companies offer flow-thru services using, for example, Hypertransport of SPI4.2 interfaces. This forces the network equipment manufacturer to purchase a separate component for each ingress port. The look-aside interfaces are cumbersome and generally are not flexible. What is really needed is a flexible mix-and-match architecture that allows packets to be quickly processed by any number of services and in any order, which can be controlled dynamically in an optimal fashion. The present invention provides the basis for this flexible mix-and-match architecture.

Packet Scheduling

Figure 3:
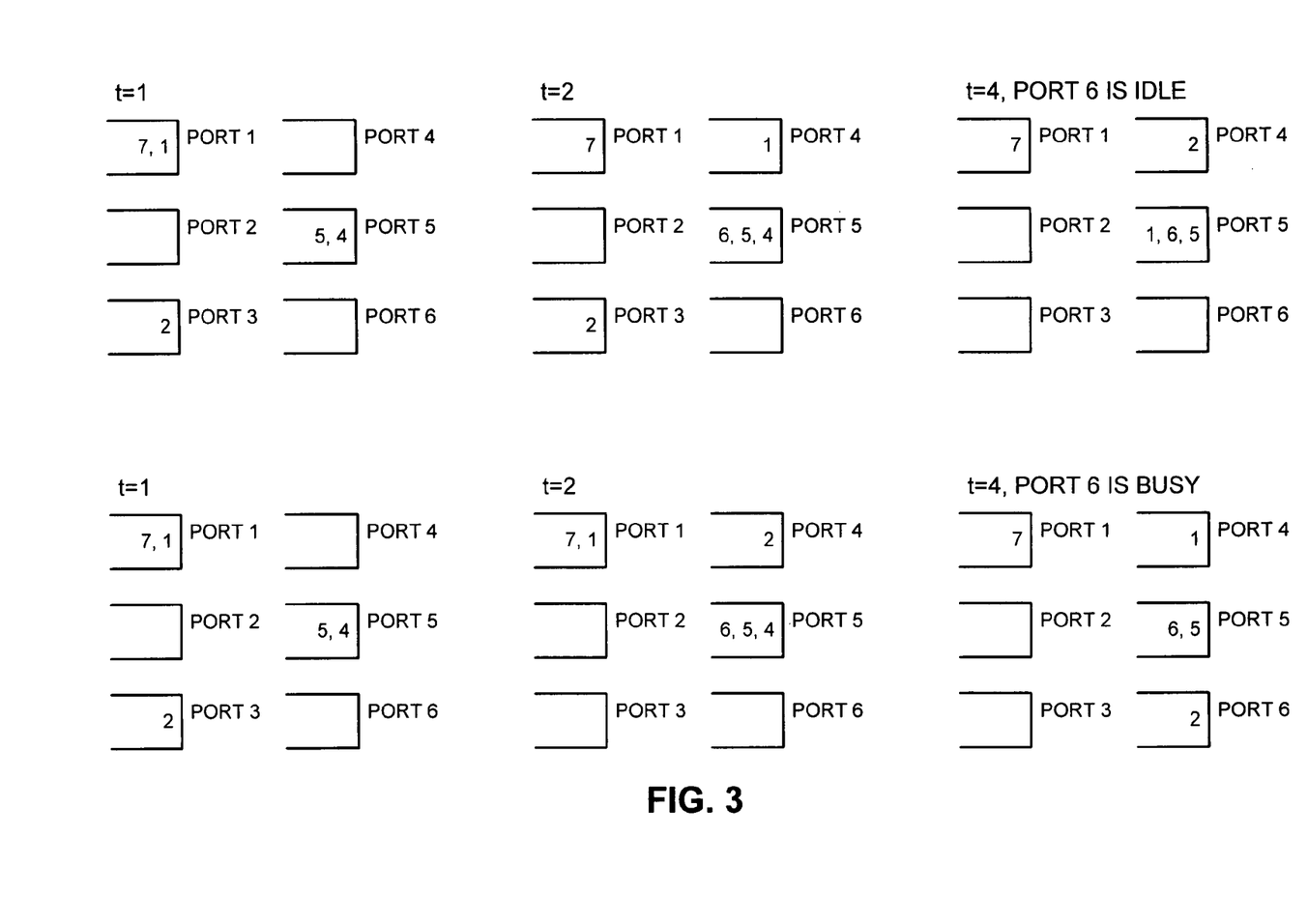
FIG. 3 illustrates a packet scheduling example in accordance with an embodiment of the present invention.

FIG. 3 illustrates an example of the packet-scheduling process in accordance with an embodiment of the present invention. This example illustrates how the look-ahead information, provided by the packet classifier as a tag pre-pended to the packet header, can be used by the look-ahead-based packet scheduler to make a better scheduling decision than Maximum Weight Matching (MWM). Suppose packet 1 requires services at port 4 and 5, and packet 2 requires services at port 4 and 6. Port 5 already has packets queued up to keep it busy. If packet 1 is chosen before packet 2, then there is a chance of an idle port 6, whereas if packet 2 is chosen, there is less chance of an idle port, hence increased throughput.

Process of Packet Scheduling

Figure 4:
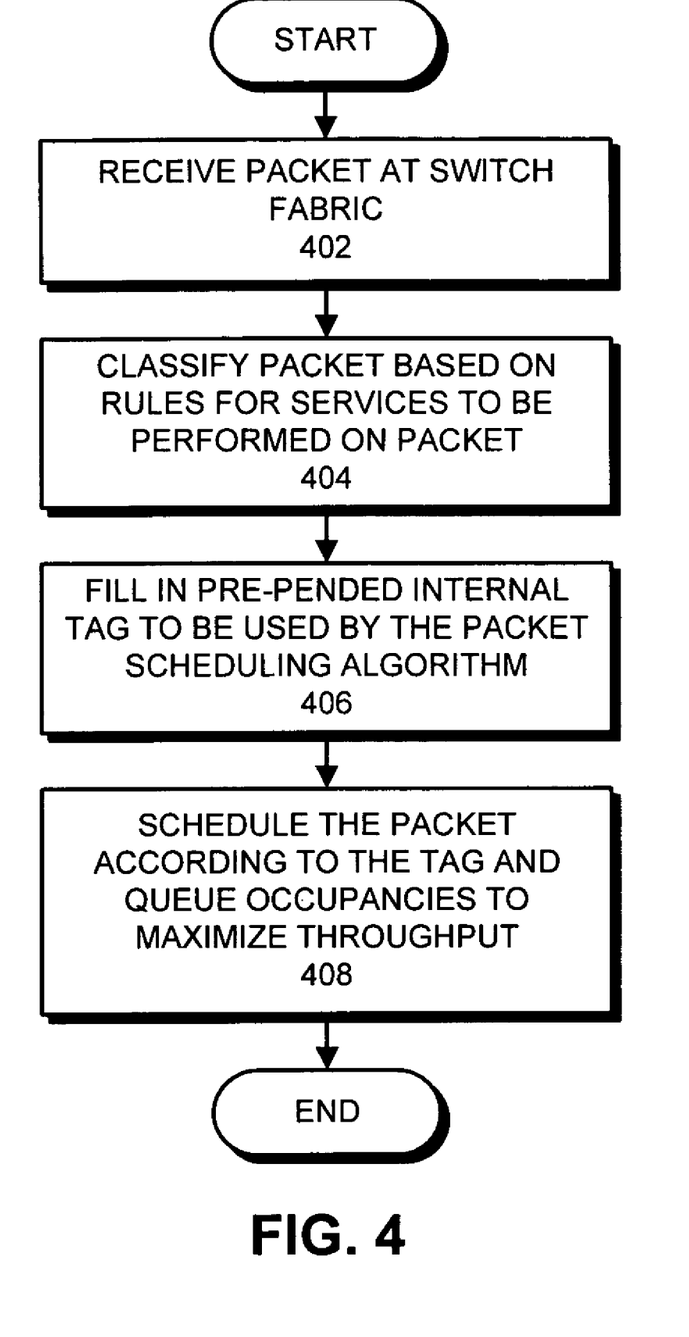
FIG. 4 presents a flowchart illustrating the process of packet scheduling in accordance with an embodiment of the present invention.

FIG. 4 presents a flowchart illustrating the process of packet scheduling in accordance with an embodiment of the present invention. The system starts by receiving a packet at layer 2/3 edge switch 160 (step 402). Next, the system classifies the packet based on user defined rules for services to be performed on the packet (step 404). The system then pre-pends a tag to the packet that identifies the services that are to be performed on the packet to aid the scheduler (step 406). Finally, the system utilizes the tag information and the queue occupancies for all of the queues on the switch fabric in layer 2/3 edge switch 160 to schedule the packet on the switch fabric in a manner that maximizes throughput (step 408).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for scheduling packets in a multi-service integrated switch fabric, wherein packet services are attached directly to the switch fabric, the method comprising:

receiving a packet at the switch fabric;

using pre-defined rules to identify packet services to perform operations on the packet;

including a tag with the packet, wherein the tag identifies the packet services to be performed on the packet;

determining an order of the packet services;
writing the order to the tag; and
scheduling the packet on the switch fabric, wherein scheduling the packet involves considering the packet services identified in the tag and the occupancies of queues associated with the identified packet services.

2. The method of claim 1, wherein packet services perform operations related to:
server load balancing;
firewall;
half Network Address Translation (NAT);
full NAT;
Level 7 processing;
Level 4 forwarding;
Secure Sockets Layer (SSL);
Internet Protocol Security (IPSec);
Layer 2 Tunneling Protocol (L2TP);
layer 2 routing; and
layer 3 routing.

3. The method of claim 1, wherein the packet services perform operations on the packet that do not depend on the packet payload.

4. The method of claim 1, further comprising:
receiving a second packet at the switch fabric;
using pre-defined rules to identify packet services to perform operations on the second packet;
including a tag with the second packet, wherein the tag identifies the packet services to be performed on the second packet; and
scheduling the second packet on the switch fabric, wherein scheduling the second packet involves considering the packet services identified in the tags of the packet and of the second packet and considering the occupancies of queues associated with the identified packet services of the packet and of the second packet.

5. The method of claim 1, wherein the switch fabric is a data center switch fabric.

6. The method of claim 1, wherein scheduling the packet is scheduled on a Combined Input/Output Queued (CIOQ) switch.

7. The method of claim 1, wherein the packet services are performed by a special purpose processor.

8. A switch comprising facilities for scheduling packets in a multi-service integrated switch fabric, wherein packet services are attached directly to the switch fabric, comprising:
a receiving mechanism configured to receive a packet at the switch fabric;
an identification mechanism configured to use pre-defined rules to identify packet services to perform operations on the packet;
a tagging mechanism configured to include a tag with the packet, wherein the tag identifies the packet services to be performed on the packet;
a determination mechanism configured to determine an order of the packet services;
wherein the tagging mechanism is further configured to write the order to the tag; and
a scheduling mechanism configured to schedule the packet on the switch fabric, wherein scheduling the packet involves considering the packet services identified in the tag and the occupancies of queues associated with the identified packet services.

9. The switch of claim 8, wherein packet services perform operations related to:
server load balancing;
firewall;
half Network Address Translation (NAT);
full NAT;
Level 7 processing;
Level 4 forwarding;
Secure Sockets Layer (SSL);
Internet Protocol Security (IPSec);
Layer 2 Tunneling Protocol (L2TP);
layer 2 routing; and
layer 3 routing.

10. The switch of claim 8, wherein the packet services perform operations on the packet that do not depend on the packet payload.

11. The switch of claim 8, further comprising:
a second receiving mechanism configured to receive a second packet at the switch fabric;
wherein the identification mechanism is further configured to use pre-defined rules to identify packet services to perform operations on the second packet;
wherein the tagging mechanism is further configured to include a tag with the second packet, wherein the tag identifies the packet services to be performed on the second packet; and
wherein the scheduling mechanism is further configured to schedule the second packet on the switch fabric, wherein scheduling the second packet involves considering the packet services identified in the tags of the packet and of the second packet and considering the occupancies of queues associated with the identified packet services of the packet and of the second packet.

12. The switch of claim 8, wherein the switch fabric is a data center switch fabric.

13. The switch of claim 8, wherein the switch is a Combined Input/Output Queued (CIOQ) switch.

14. An apparatus for scheduling packets in a multi-service integrated switch fabric, wherein packet services are attached directly to the switch fabric, comprising:
a receiving mechanism configured to receive a packet at the switch fabric;
an identification mechanism configured to use pre-defined rules to identify packet services to perform operations on the packet;
a tagging mechanism configured to include a tag with the packet, wherein the tag identifies the packet services to be performed on the packet;
a determination mechanism configured to determine an order of the packet services;
wherein the tagging mechanism is further configured to write the order to the tag; and
a scheduling mechanism configured to schedule the packet on the switch fabric, wherein scheduling the packet involves considering the packet services identified in the tag and the occupancies of queues associated with the identified packet services.

15. The apparatus of claim 14, wherein packet services perform operations related to:
server load balancing;
firewall;
half Network Address Translation (NAT);
full NAT;
Level 7 processing;
Level 4 forwarding;
Secure Sockets Layer (SSL);
Internet Protocol Security (IPSec);
Layer 2 Tunneling Protocol (L2TP);
layer 2 routing; and
layer 3 routing.

16. The apparatus of claim 14, wherein the packet services perform operations on the packet that do not depend on the packet payload.

17. The apparatus of claim 14, further comprising:
- a second receiving mechanism configured to receive a second packet at the switch fabric;
- wherein the identification mechanism is further configured to use pre-defined rules to identify packet services to perform operations on the second packet;
- wherein the tagging mechanism is further configured to include a tag with the second packet, wherein the tag identifies the packet services to be performed on the second packet; and
- wherein the scheduling mechanism is further configured to schedule the second packet on the switch fabric, wherein scheduling the second packet involves considering the packet services identified in the tags of the packet and of the second packet and considering the occupancies of queues associated with the identified packet services of the packet and of the second packet.

18. The apparatus of claim 14, wherein the switch fabric is a data center switch fabric.

19. The apparatus of claim 14, wherein the scheduling mechanism is part of a Combined Input/Output Queued (CIOQ) switch.

20. The apparatus of claim 14, wherein the packet services are performed by a special purpose processor.

* * * * *